Aug. 18, 1936.  C. G. CURTIS  2,051,436
DIESEL ENGINE
Filed Oct. 30, 1931  3 Sheets-Sheet 2

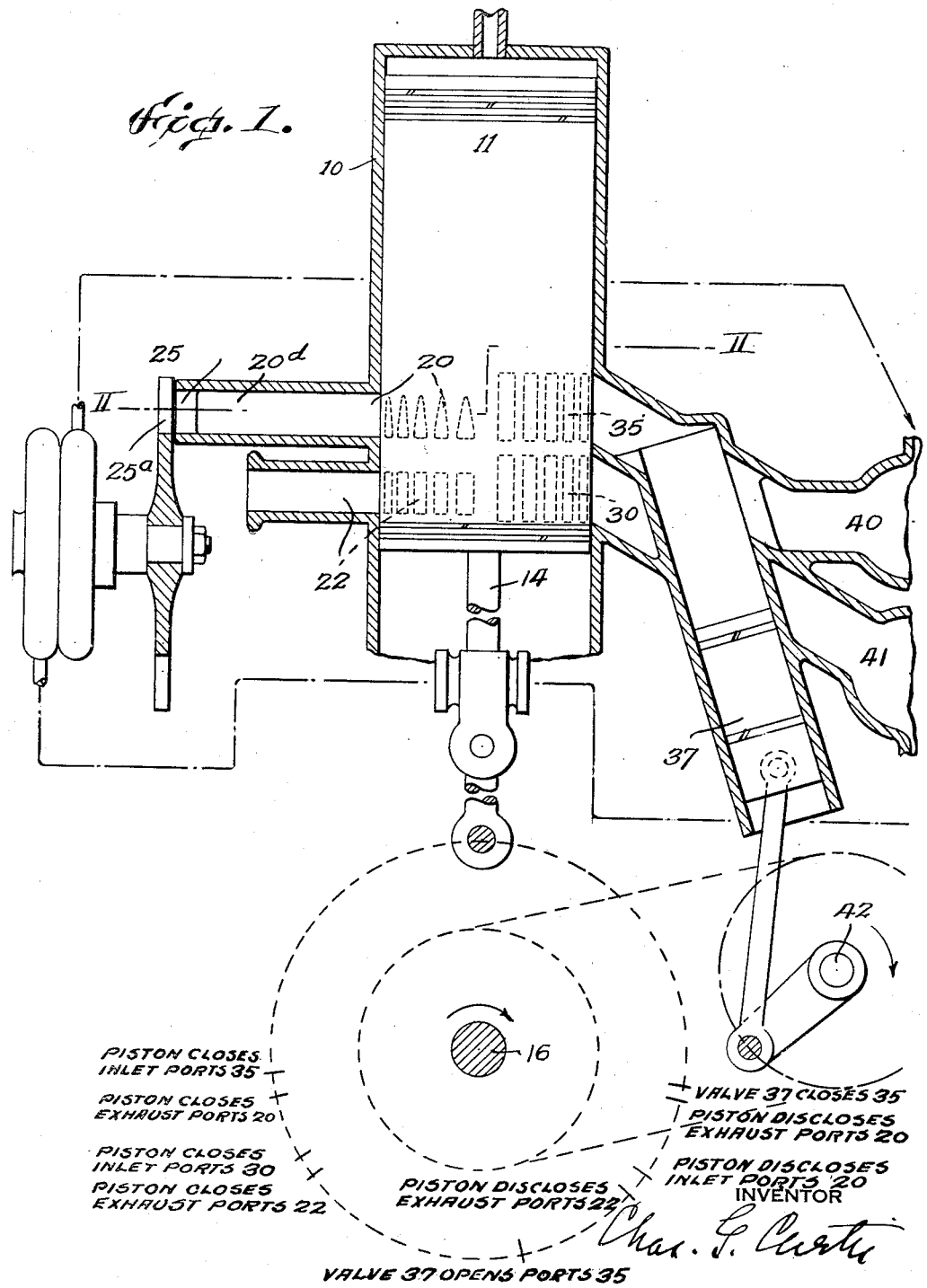

INVENTOR
Chas. G. Curtis

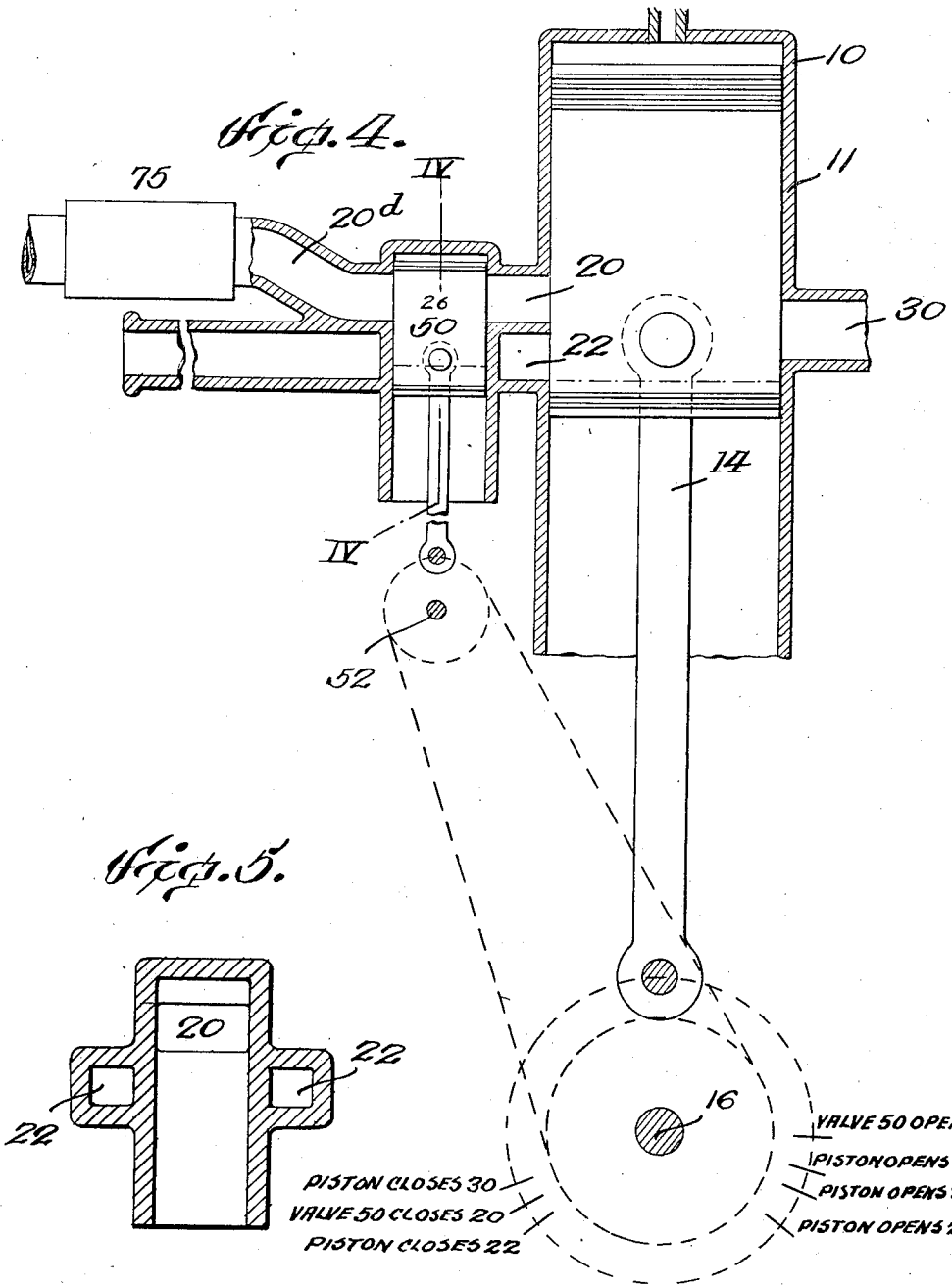

Patented Aug. 18, 1936

2,051,436

UNITED STATES PATENT OFFICE 2,051,436

DIESEL ENGINE

Charles G. Curtis, New York, N. Y., assignor to Curtis Gas Engine Corporation, New York, N. Y., a corporation of New York Application October 30, 1931, Serial No. 572,029

6 Claims. (Cl. 123—65)

This invention relates to two-cycle internal combustion engines, and provides improvements therein. My invention provides in two-cycle internal combustion engines an efficient and satisfactory means of utilizing the pressure energy in the exhaust, or puff-gas, at the end of the expansion stroke to develop power for furnishing scavenging air or for any other purpose, and said means may further provide power for furnishing air for supercharging the cylinder so as to increase its power. It has been proposed to discharge the exhaust gas from the cylinders of a two-cycle engine into an exhaust receiver under conditions adapted to maintain a pressure of several pounds in such a receiver and to feed the hot gas from the receiver to a turbine in which the power is developed by expansion from the receiver pressure to the atmosphere. This method, however, is open to great objection because the scavenging has to be carried on against a back pressure in the exhaust pipe of several pounds and this necessitates using quite a high scavenging pressure,—several pounds above the receiver pressure—so that the work required to compress the scavenging air is excessive. Moreover, the pressure fluctuations in the receiver are serious, the energy developed by the very limited pressure range is comparatively small, and the power developed may be insufficient to compress all the scavenging air required.

By my invention I am enabled to utilize a very much greater amount of the pressure energy in the gas at the end of the stroke, this pressure being something like 50 or 60 pounds in a supercharged engine, and to utilize this pressure in the form of velocity developed as the gas issues from the cylinder when the exhaust ports conveying the puff-gas open. This pressure discharge from the cylinder is conveyed to the turbine in such a way as to conserve more or less the velocity developed as the gas flows through the exhaust ports, and after passing through the turbine is discharged to the atmosphere. After the pressure drop has taken place however additional exhaust ports open and scavenging is carried on mainly through these lower exhaust ports which discharge the gases displaced by scavenging more or less freely into the atmosphere. By closing these upper exhaust ports, which deliver the pressure dropping exhaust to the turbine, on the return stroke, I am enabled to raise the pressure in the cylinder materially and under certain conditions up to or above the scavenging pressure so that a substantial supercharge is secured in this way.

My invention further provides means for avoiding material fluctuation of pressure in the exhaust pipe or header, particularly so as to permit scavenging to be carried on with the least amount of resistance. This I accomplish by arranging two sets of exhaust ports, one above the other, the upper one conveying the pressure dropping exhaust into a muffler or silencing device so as to eliminate or largely reduce the noise or barking caused by the exhaust in a two-cycle engine. The other set of ports are disclosed by the piston in time to permit the scavenging to be carried on freely and the exhaust gas displaced by scavenging to the atmosphere without the necessity of passing through any silencer. In a two-cycle engine, particularly in a high speed engine, the period during which the pressure dropping exhaust takes place is extremely short, and the noise of the exhaust is correspondingly great, whereas in a four-cycle engine the pressure dropping takes place gradually due to the fact that the exhaust valve opens gradually, so that in a four-cycle engine the pressure drop is spread over a period many times as great as in a two-cycle engine. It is very important in a two-cycle engine therefore to muffle the exhaust in such a way as not to retard or interfere with free scavenging.

The invention further includes features of construction, hereinafter pointed out, which are improvements.

Embodiments of the invention are illustrated in the accompanying drawings, wherein Fig. 1 is a vertical sectional view of one embodiment, showing a two-cycle port-scavenged cylinder provided with sets of exhaust ports at two levels, one set feeding into a turbine, also with two rows of inlet ports, the upper one being valve-controlled, according to my invention.

Fig. 4 is a similar view of another embodiment, a single acting two-cycle engine being shown.

Fig. 5 is a cross-section on the line IV—IV Fig. 4, at right angles to the plane of Fig. 4.

Figure 3:
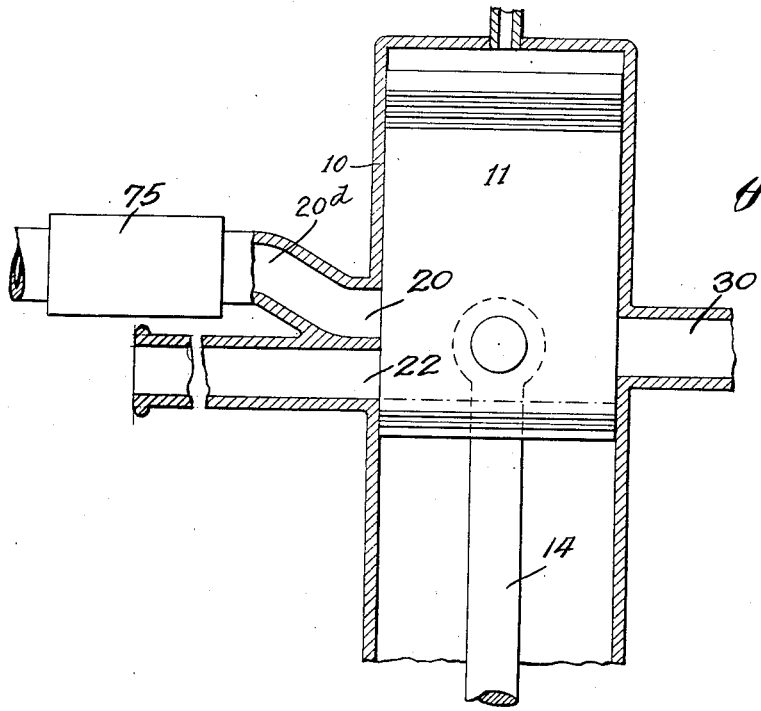
Fig. 3 is a vertical sectional view of a further embodiment, a single-acting two-cycle engine being shown.

Referring to said drawings, numeral 10, designates a cylinder, and 11 a piston of a two-cycle internal combustion engine. The piston 11 may be connected in the usual manner by a connecting rod 14 with the usual crank shaft 60.

The cylinder 10 is provided with exhaust ports at two levels, one set, designated as the upper set, indicated by the numeral 20, and another set, designated as the lower set, indicated by the numeral 22. The exhaust ports 20, and 22 are all in that part of the cylinder-wall which is remote from the cover-end of the cylinder.

The cylinder 10 is also provided with a means 30 for admitting scavenging air thereto, the means 30 preferably comprising a port which opens into that part of the cylinder-wall which is remote from the cover-end of the cylinder, the engine piston 11 preferably acting as a valve to close and disclose the port 30.

The engine piston 11, in the latter part of its working stroke, first uncovers or discloses the upper ports 20, releasing partially expanded exhaust gas (puff-gas) through ports 20. The exhaust gas passing out through the ports 20 passes through a turbine 25, the pressure within the cylinder 10 being rapidly dropped. The turbine also functions in preventing the noise which would otherwise result from the direct release of the partially expanded exhaust gas from the cylinder 10 to the atmosphere.

The exhaust ports 22 lead to the atmosphere, and when these later exhaust ports are disclosed by the piston 11, the pressure in the cylinder is so reduced that the exhaust gas flowing out through the exhaust ports 22 enters the atmosphere silently, or at least with the noise so diminished as to be unobjectionable.

Numeral 30 designates inlet ports, preferably located in that part of the cylinder-wall which is remote from the cylinder-cover, so as to be disclosed and closed by the engine piston 11, through which scavening air is admitted.

By the arrangement described, I am enabled to utilize in the turbine the part of the exhaust gas passing out through ports 20 with a dropping pressure (puff-gas), and to carry on the scavenging through the exhaust ports 22 which have free access to the atmosphere, and which therefore offer no resistance. Moreover, the described arrangement of exhaust ports enables me to confine the pressure waves produced by the sudden pressure drop of the partially expanded exhaust-gas passing out through the upper exhaust ports 20, so that the passage through the lower exhaust ports 22 can be carried free from air pulsations or waves which would interfere with free scavenging.

Figure 2:
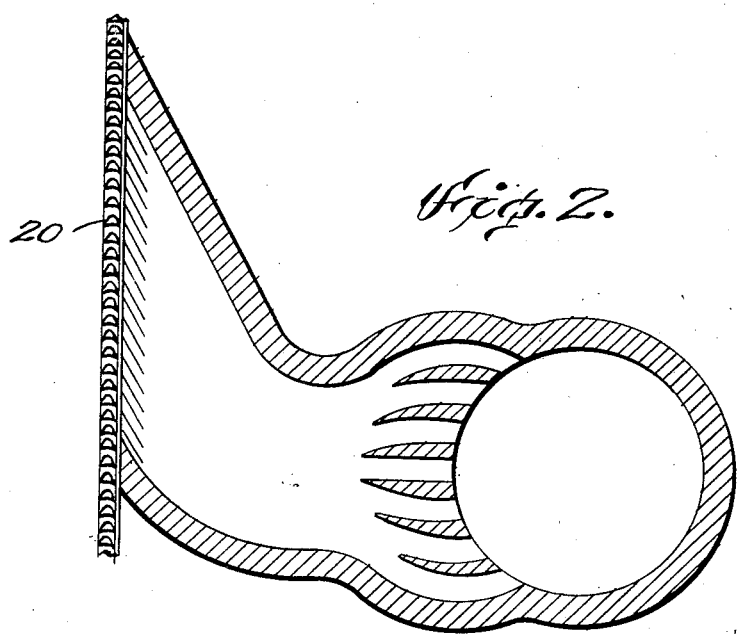
Fig. 2 is a section on the line II—II Fig. 1 and showing the passage leading from the engine cylinder to the gas turbine.

The exhaust ports 20 lead into a passage 20d which conveys the pressure-dropping gas (puff-gas) at high velocity into the nozzle or nozzles of the turbine wheel as shown in Fig. 2. The cross-sectional area of this passage 20d I make substantially equal to the combined area of the upper ports 20 and the exhaust bridges 20e may be shaped as shown so that the streams as they emerge come together and fill the exhaust passage. In this way the velocity developed by the pressure drop of the exhaust gas in issuing from the cylinder 10 is carried clear through to the nozzle and delivered to the turbine wheel largely in the form of velocity. If the passage 20d connecting the cylinder with the turbine wheel be of considerable length, as it might be in a multi-cylinder engine, there will be a considerable loss of velocity due to friction and eddy currents, and the passage 20d on the way to the turbine should therefore gradually enlarge in cross-sectional area so as to off-set this loss of velocity, but nevertheless to conserve it as well as practicable. When the ports 20 begin to open the passage 20d leading to the turbine wheel is too large to maintain the full velocity of exit, but as the ports 20 become more nearly wide open the flow of gas will be sufficient in volume to enable considerable of the velocity to be conserved and led into the turbine wheel, so that the average velocity discharged through the nozzles of the turbine 25 will during the pressure dropping period be considerable and should be quite enough to do the work of driving a blower for furnishing scavenging air. The dropping from the cylinder pressure to the pressure of the atmosphere represents an amount of energy equal to five or six times the amount of work required theoretically to compress a reasonable amount of scavenging air, say 150 percent of the cylinder volume at 3 pounds pressure. If therefore the efficiency of the turbine 25 and the compressor driven thereby is as high as 20 percent, the pressure drop due to the puff will be sufficient to develop enough power in the turbine 25 to compress the air required for scavenging. It may also be more than sufficient for this purpose so that it could be used to develop additional power. The lower exhaust ports 22 I arrange to perform simply the function of passing the exhaust gas pushed out substantially at atmospheric pressure by the scavenging air, and as this exhaust gas contains very little pressure energy it is not desirable to pass it through the turbine but to pass it freely to the atmosphere. I set the ports 20 at such a height with reference to the scavenging air ports 30 that the necessary pressure drop down to or below the scavenging pressure will take place by the time the piston discloses the ports 30. After the pressure drop takes place through ports 20 and the puff gas flows through the wheel of turbine 25 with a free passage, except the loss due to friction, scavenging begins and can take place through the exhaust ports 22 and also through the exhaust ports 20 simultaneously. One advantage of this arrangement as heretofore explained is that the passage from the ports 22 can be made quite free from waves while if the waves due to the pressure drop are confined to the upper exhaust pipe 20d they will not interfere so much with the scavenging function.

A great advantage of this arrangement is that ample energy is obtained from the pressure drop of the exhaust-gas (puff-gas) to drive the exhaust turbine 25 without the use of any exhaust valves.

To supercharge the cylinder 10, I may provide a set of air inlet-ports 35 which may be located in the cylinder wall above the inlet ports 30, and above the exhaust ports 20 (without valve-control), and I provide a valve 37 for closing the passage to ports 35 on the expansion stroke of piston 11. On the expansion stroke of the piston 11 the upper set of ports 35 are kept closed by the valve 37, which valve I arrange to have mechanically opened quite rapidly by the time the ports are disclosed, or later, on the return movement of the piston. The two rows of ports 35 and 30 may be fed by scavenging air of the same pressure or they may be fed from two independent receivers 40, 41, the upper receiver 40 carrying a pressure substantially above the scavenging pressure supplied by the lower receiver 41, in order to throw into the cylinder 10 a supercharge at the last moment and thus increase the power of the engine. In this case the valve 37 would be arranged to close shortly before the upper exhaust port 20 closes so that the incoming high pressure air would not escape through the exhaust ports but to a limited extent, and the pressure within the cylinder 10 would be raised substantially. If the pressures in the receivers 40 and 41 were made the same, there is no reason why the valve 35 would not be made to open as soon as the ports 30 are disclosed by the movement of the piston 11.

The valve 37 is preferably of the piston-type and is conveniently driven by a crank-shaft 42 driven from the engine crank-shaft 16.

Referring to Figs. 2-5 inclusive, parts corresponding to those shown in Fig. 1 are correspondingly numbered. Instead of the turbine 25, a muffler or silencer 75 is placed in the passage 20d through which the puff-gas escapes.

When the piston 11, on its downward stroke, discloses the ports 20, puff-gas under considerable initial pressure escapes through the muffler 75. Before the piston 11 discloses the ports 22 which lead to the atmosphere, the pressure of the gas in the cylinder 10 has been dropped to nearly atmospheric pressure. The inlet ports 30 are disclosed by piston 11 before ports 22 are disclosed, so that when ports 22 open the scavenging air entering through ports 30 pushes the gas out through the ports 22. The ports 22 therefore serve essentially for venting the push-gas, i. e. the burned gas which is pushed out by the scavenging air; and the gas which escapes through the ports 22 passes out into the atmosphere without making an objectionable noise.

Referring to Fig. 4 a valve 50 may be placed in the passage from the exhaust ports 20. Valve 50 is conveniently of the piston type and may be driven by a crank-shaft 52 driven from the engine crank-shaft 16. The valve 50 is timed so as to be open when the engine piston 11 discloses the ports 20 on its working stroke, and to close on the return stroke of the engine piston 11, so as to close or restrict the passage through the ports 20 before the engine piston closes the inlet ports 30, and thereby obtain a rising pressure, or supercharge, before the ports 30 are cut off.

What I claim as new and desire to secure by Letters Patent of the United States is:

1. An internal combustion engine comprising a cylinder, juxtaposed ducts leading into said cylinder, a piston valve controlling the passage through one of said ducts, a cylinder for said piston-valve passing through said other duct, and passages in said last-named duct around said valve-cylinder.

2. A two-stroke cycle internal combustion engine comprising a cylinder and a reciprocatory-piston, separate exhaust passages, one for puff-gas and the other for scavenged gas, the passage for scavenged-gas being in communication directly with the atmosphere, and a muffler communicating at one side with the passage for puff-gas and at its other side communicating with the atmosphere, the construction and arrangement being such that the pressure within the cylinder, before the scavenged-gas passage is opened, is dropped to approximately atmospheric pressure by the escape of puff-gas through the puff-gas exhaust passage and muffler to the atmosphere, the muffler operating to permit the puff-gas to expand before the cylinder is opened to the scavenged-gas passage to thereby drop the pressure of the gas in the cylinder and to discharge the gas therethrough to the atmosphere at approximately atmospheric pressure, with the noise substantially muffled, the gas within the cylinder, after the aforesaid pressure drop, being expelled directly to the atmosphere through the scavenging passage, at approximately atmospheric pressure, and with the noise substantially muffled.

3. A combination according to claim 5, further including an exhaust valve controlling the passage through said upper set of exhaust-ports, and arranged and operating to open on the expansion stroke of said engine to release the puff-gas and thereby effect, as aforesaid a drop of the cylinder pressure to approximately atmospheric pressure, and thereupon to close to enable the cylinder to receive a supercharge.

4. A combination according to claim 2, further including exhaust ports in that end of the cylinder which is remote from the cylinder cover, and comprising upper and lower sets, the upper set being in communication with the puff-gas passage and the lower set being in communication with the scavenged-gas passage, a valve controlling the puff-gas passage, and means arranged and operating to open said valve on the expansion stroke of said engine to release the puff-gas and thereby effect, as aforesaid, a drop of the cylinder-pressure to approximately atmospheric pressure, and to close said valve before said upper set of exhaust ports is closed by said piston on its return stroke to enable the cylinder to receive a supercharge.

5. The combination with the cylinder of a two-cycle internal combustion engine, of two sets of exhaust ports, one set above the other, the upper set taking care of the puff-gas and the lower set taking care of the scavenged gas, separate exhaust passages for each of said sets of exhaust ports, the passage in communication with the scavenging set of ports leading directly to the atmosphere, and a muffler communicating at one side with said passage which is in communication with said puff-gas set of exhaust ports and at its other side communicating with the atmosphere, the construction and arrangement being such that the pressure within the cylinder, before the exhaust ports for the scavenged gas are opened, is dropped to approximately atmospheric pressure by the escape of the puff-gas through the puff-gas exhaust ports, passage, and muffler, to the atmosphere, the muffler operating to permit the gas to expand before the cylinder is opened to the scavenged-gas passage to thereby drop the pressure of the gas in the cylinder, and to discharge the gas therethrough to the atmosphere at approximately atmospheric pressure with the noise substantially muffled, the gas within the cylinder, after the aforesaid pressure drop, being expelled directly to the atmosphere through the scavenging exhaust ports, at approximately atmospheric pressure, and with the noise substantially muffled.

6. A combination according to claim 2, further including an exhaust valve controlling the passage through said puff-gas passage, and arranged and operating to open on the expansion stroke of said engine to release the puff-gas and thereby effect, as aforesaid a drop of the cylinder pressure to approximately atmospheric pressure, and thereupon to close to enable the cylinder to receive a supercharge.

CHAS. G. CURTIS.